United States Patent
Kwon et al.

(10) Patent No.: US 8,260,091 B2
(45) Date of Patent: Sep. 4, 2012

(54) APPARATUS AND METHOD FOR SEARCHING FOR ERRONEOUS DATA

(75) Inventors: Chang-yeul Kwon, Yongin-si (KR); Seong-soo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1086 days.

(21) Appl. No.: 12/172,635

(22) Filed: Jul. 14, 2008

(65) Prior Publication Data

US 2009/0041389 A1 Feb. 12, 2009

Related U.S. Application Data

(60) Provisional application No. 60/954,878, filed on Aug. 9, 2007.

(30) Foreign Application Priority Data

Nov. 28, 2007 (KR) .................. 10-2007-0121894

(51) Int. Cl.
*G06K 9/03* (2006.01)

(52) U.S. Cl. ......... 382/309; 708/530; 708/531; 714/758

(58) Field of Classification Search .................. 235/437; 377/28; 386/264, 268, 309; 382/309; 708/530, 708/531; 714/753, 754, 758, E11.211
See application file for complete search history.

(56) References Cited

U.S. PATENT DOCUMENTS

| | | | |
|---|---|---|---|
| 4,751,590 A * | 6/1988 | Wilkinson | 386/268 |
| 5,325,372 A * | 6/1994 | Ish-Shalom | 714/757 |
| 5,671,156 A | 9/1997 | Weerackody et al. | |
| 5,946,320 A | 8/1999 | Decker | |
| 6,161,207 A | 12/2000 | Lockhart et al. | |
| 6,219,457 B1 * | 4/2001 | Potu | 382/246 |
| 6,292,917 B1 | 9/2001 | Sinha et al. | |
| 6,314,541 B1 | 11/2001 | Seytter et al. | |
| 6,615,382 B1 | 9/2003 | Kang et al. | |
| 6,681,364 B1 | 1/2004 | Calvignac et al. | |
| 6,754,277 B1 | 6/2004 | Heinzelman et al. | |
| 6,757,851 B1 | 6/2004 | Park et al. | |
| 6,766,105 B1 | 7/2004 | Okutani et al. | |
| 7,178,082 B2 | 2/2007 | Yu et al. | |
| 7,185,257 B2 | 2/2007 | Kim et al. | |
| 7,346,018 B2 | 3/2008 | Holtzman et al. | |
| 7,420,568 B1 * | 9/2008 | Bittel et al. | 345/544 |
| 7,562,277 B2 | 7/2009 | Park et al. | |
| 7,599,363 B2 | 10/2009 | Jang et al. | |
| 7,778,242 B1 | 8/2010 | Barany et al. | |
| 7,979,784 B2 | 7/2011 | Shao et al. | |

(Continued)

FOREIGN PATENT DOCUMENTS

CN 1292626 A 4/2001

(Continued)

OTHER PUBLICATIONS

Decision to Grant Patent issued by Korean Patent Office dated Dec. 24, 2009 in counterpart KR application No. 2007-0121894.

(Continued)

*Primary Examiner* — Gregory F Cunningham
(74) *Attorney, Agent, or Firm* — Sughrue Mion, PLLC

(57) ABSTRACT

An apparatus and method for searching for erroneous data is provided. The method of searching for erroneous data includes checking received data using an error-checking field included in the received data, and compensating for erroneous data of the checked data.

27 Claims, 7 Drawing Sheets

U.S. PATENT DOCUMENTS

| | | | |
|---|---|---|---|
| 2002/0031122 A1 | 3/2002 | Martini et al. | |
| 2002/0093937 A1 | 7/2002 | Kim et al. | |
| 2002/0157058 A1 | 10/2002 | Ariel et al. | |
| 2002/0191643 A1 | 12/2002 | Yun et al. | |
| 2003/0212946 A1 | 11/2003 | Kroeger | |
| 2003/0229822 A1 | 12/2003 | Kim et al. | |
| 2004/0083417 A1 | 4/2004 | Lane et al. | |
| 2004/0243901 A1 | 12/2004 | Wang | |
| 2005/0002368 A1 | 1/2005 | Kwon et al. | |
| 2005/0038954 A1* | 2/2005 | Saliba | 711/100 |
| 2005/0123042 A1 | 6/2005 | Park | |
| 2005/0180509 A1 | 8/2005 | Olivieri et al. | |
| 2006/0005106 A1 | 1/2006 | Lane et al. | |
| 2006/0034317 A1 | 2/2006 | Hong et al. | |
| 2007/0165566 A1 | 7/2007 | Khan et al. | |
| 2007/0189397 A1 | 8/2007 | Ngo et al. | |
| 2007/0198887 A1 | 8/2007 | Reznic et al. | |
| 2007/0204205 A1 | 8/2007 | Niu et al. | |
| 2007/0234134 A1 | 10/2007 | Shao et al. | |
| 2007/0291855 A1 | 12/2007 | Reznic et al. | |
| 2008/0098274 A1 | 4/2008 | Kwon et al. | |
| 2008/0267190 A1* | 10/2008 | Baker et al. | 370/394 |
| 2009/0041389 A1 | 2/2009 | Kwon et al. | |
| 2009/0086638 A1 | 4/2009 | Niu et al. | |
| 2009/0086699 A1 | 4/2009 | Niu et al. | |

FOREIGN PATENT DOCUMENTS

| | | |
|---|---|---|
| CN | 1394406 A | 1/2003 |
| KR | 1998-050448 A | 9/1998 |
| KR | 1999-0080690 A | 11/1999 |
| KR | 2001-0019441 A | 3/2001 |
| KR | 10-2002-0065824 A | 8/2002 |
| KR | 2002-0081521 A | 10/2002 |
| KR | 10-2003-0035303 A | 5/2003 |
| KR | 10-2003-0060654 A | 7/2003 |
| KR | 2004-0028098 A | 4/2004 |
| KR | 10-2005-0004082 A | 1/2005 |
| WO | WO 2007/021097 A1 | 2/2007 |

OTHER PUBLICATIONS

Communication dated Sep. 22, 2011 issued by the Mexican Patent Office in counterpart Mexican Patent Application No. MX/a/2009/010385.

Communication from the Chinese Patent Office, issued Jul. 26, 2011 in counterpart Chinese Application No. 200880010257.8.

Communication from the Korean Intellectual Property Office, dated Jul. 29, 2009, issued in counterpart Korean Application No. 10-2008-0022581.

Hitachi Ltd. et al., "High Definition Multimedia Interface (HDMI) Specification Version 1.2", Aug. 22, 2005, pp. 1-214.

International Search Report [PCT/ISA/210 & PCT/ISA/237] from the International Searching Authority, dated Jun. 30, 2008, issued in counterpart International Application No. PCT/KR2008/001692.

Office Action from the United States Patent Office, dated Jan. 19, 2012, issued in counterpart U.S. Appl. No. 12/056,717.

Office Action from the United States Patent Office, dated Sep. 28, 2011, issued in counterpart U.S. Appl. No. 12/056,717.

* cited by examiner

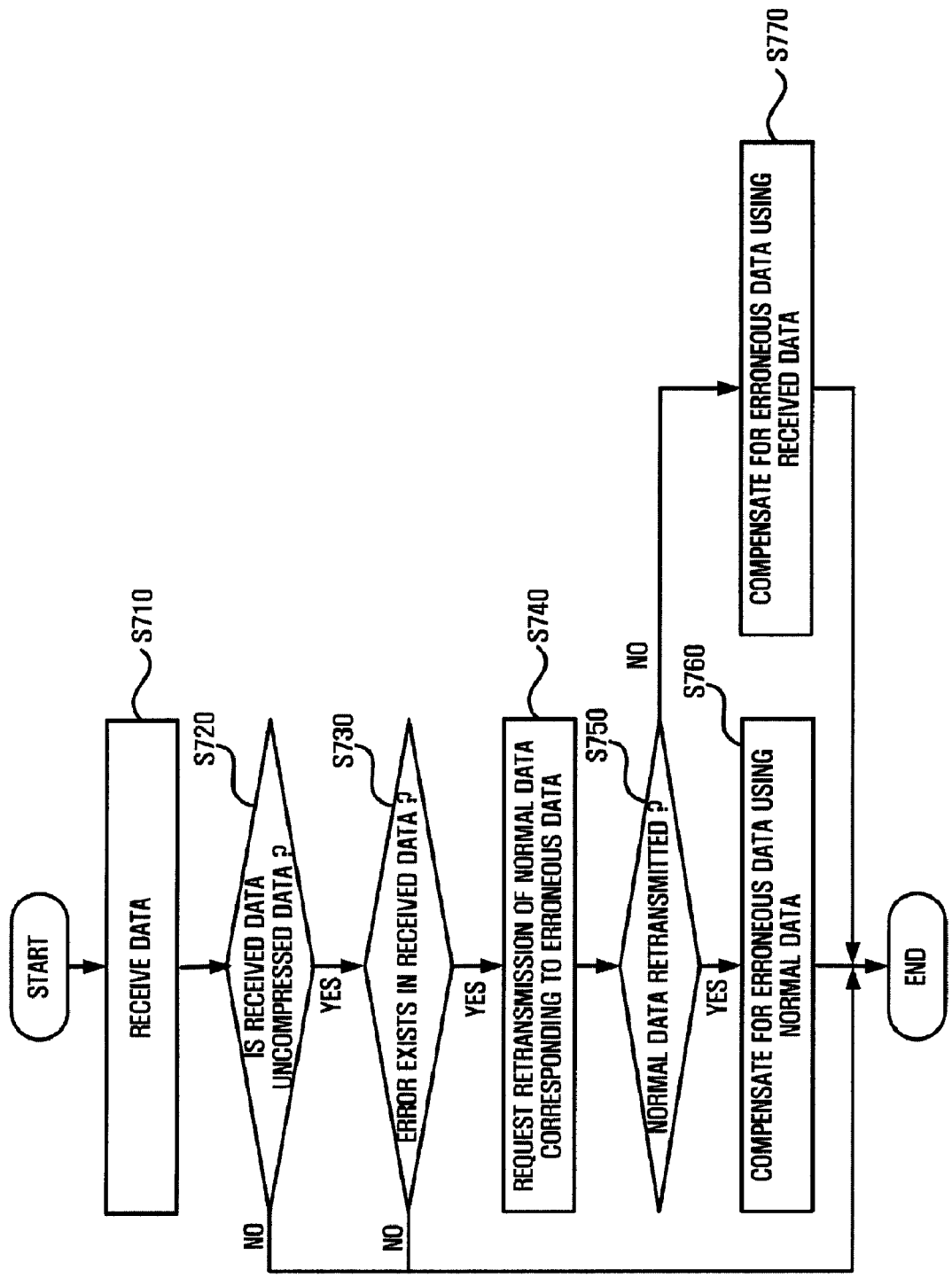

APPARATUS AND METHOD FOR SEARCHING FOR ERRONEOUS DATA

CROSS-REFERENCE TO RELATED PATENT APPLICATIONS

This application claims priority from U.S. Provisional Application No. 60/954,878, filed on Aug. 9, 2007 in the United States Patent and Trademark Office, and Korean Patent Application No. 10-2007-0121894, filed on Nov. 28, 2007 in the Korean Intellectual Property Office, the disclosure of which are incorporated herein by reference in their entirety.

BACKGROUND OF THE INVENTION

1. Field of the Invention

Apparatuses and methods consistent with the present invention relate to searching for erroneous data, and, more particularly, to searching for an erroneous data region of received data using a specified region prescribed in the data and compensating for the erroneous data region.

2. Description of the Related Art

With the spread of wireless networks, the transmission of mass multimedia data in wireless networks has been increasing, and effective data transmission methods for wireless network environments are required. In addition, wireless transmission of high-quality images, such as a digital video disk (DVD) images, high definition television (HDTV) images, and the like, among various home devices, is in demand.

At present, an IEEE 802.15.3c task group is considering a technical standard for transmitting large volumes of data in a wireless home network. This standard, known as Millimeter Wave (mmWave), uses an electromagnetic wave having a physical wavelength of several millimeters for transmission of the large volumes of data (that is, an electromagnetic wave having a frequency in the range of 30 GHz to 300 GHz). In the related art, this frequency band is an unlicensed band and is limitedly used for communication carriers, radio astronomy, or vehicle anti-collision.

FIG. 1 is a view explaining comparison of frequency bands between the IEEE 802.11 series standard and mmWave. In the IEEE 802.11b standard and the IEEE 802.11g standard, the carrier frequency is 2.4 GHz, and a channel bandwidth is about 20 MHz. Also, in the IEEE 802.11a standard and the IEEE 802.11n standard, the carrier frequency is 5 GHz, and a channel bandwidth is about 20 MHz. In contrast, in mmWave, a carrier frequency of 60 GHz is used, and the channel bandwidth is in the range of about 0.5 to 2.5 GHz. Accordingly, it can be seen that mmWave uses a much larger carrier frequency and channel bandwidth than the existing IEEE 802.11 series standards. As such, if a high-frequency signal having a wavelength in millimeters (mmWave) is used, a very high transmission rate of several Gbps can be obtained, and the size of an antenna can be set to be not more than 1.5 mm. Then, a single chip including the antenna can be implemented.

Recently, the transmission of uncompressed audio and/or video (AV) data (hereinafter referred to as "uncompressed AV data") between wireless devices using a high bandwidth of the millimeter wave has been studied. Compressed AV data is lossy-compressed through processes, such as motion compensation Discrete Cosine Transform, (DCT) transform, quantization, variable length coding, and the like, such that portions that are less sensitive to the sense of sight or the sense of hearing of a human being are eliminated. In contrast, uncompressed AV data includes digital values representing pixel components (e.g., red (R), green (G), and blue (B) color components) as they are.

Accordingly, bits included in the compressed AV data do not have significance levels, while bits included in the uncompressed AV data have significance levels. For example, as illustrated in FIG. 2, in the case of an eight-bit image, one pixel component is composed of eight bit levels. Among them, the bit representing the highest degree (i.e., the bit of the highest level) is called a most significant bit (MSB), and the bit representing the lowest degree (i.e., the bit of the lowest level) is called a least significant bit (LSB). That is, the respective bits of one byte (i.e., eight bits) have different significance levels when restoring an image signal or an audio signal.

During the transmission of AV data, an error occurring in an upper significant bit can be detected more easily than that occurring in a lower significant bit. Accordingly, during a wireless data transmission, there is a greater necessity for preventing the occurrence of error in the upper significant bit data in comparison to the lower significant bit data.

Also, according to a method of detecting an error of data being transmitted, the erroneous data is searched for using the sum of checked values of the entire data set, and it is impossible to confirm the error has occurred in the MSB.

Accordingly, there is a need for a technique of detecting an error of the MSB of the transmitted data and receiving a retransmission of the MSB, and for a technique of compensating for erroneous data using the already transmitted data in the case where the retransmission of the MSB is difficult.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an apparatus and method for detecting an error of the most significant field and receiving a retransmission of the erroneous data.

The present invention also provides an apparatus and method for detecting an error of the most significant field, and compensating for the erroneous data using data already received.

According to an aspect of the present invention, there is provided a method of searching for erroneous data which includes checking received data using an error-checking field of the received data; and compensating for erroneous data of the checked data.

According to another aspect of the present invention, there is provided an apparatus for searching for erroneous data, which includes a checking unit checking received data using an error-checking field of the received data; and a compensation unit compensating for erroneous data of the checked data.

BRIEF DESCRIPTION OF THE DRAWINGS

The above and other aspects of the present invention will be apparent from the following detailed description of exemplary embodiments of taken in conjunction with the accompanying drawings, in which:

FIG. 7 is a view illustrating a method of searching for erroneous data according to an exemplary embodiment of the present invention.

DETAILED DESCRIPTION OF THE EXEMPLARY EMBODIMENTS

Figure 1:
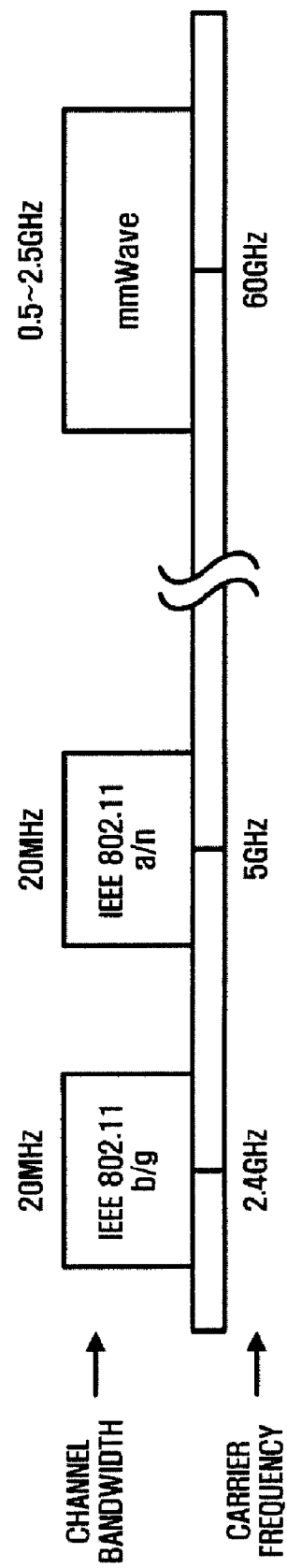
FIG. 1 is a view explaining comparison of frequency bands between the IEEE 802.11 series standard and mmWave.

Hereinafter, exemplary embodiments of the present invention will be described in detail with reference to the accompanying drawings. The aspects and features of the present invention and methods for achieving the aspects and features will be apparent by referring to the exemplary embodiments to be described in detail with reference to the accompanying drawings. However, the present invention is not limited to the exemplary embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

Figure 2:
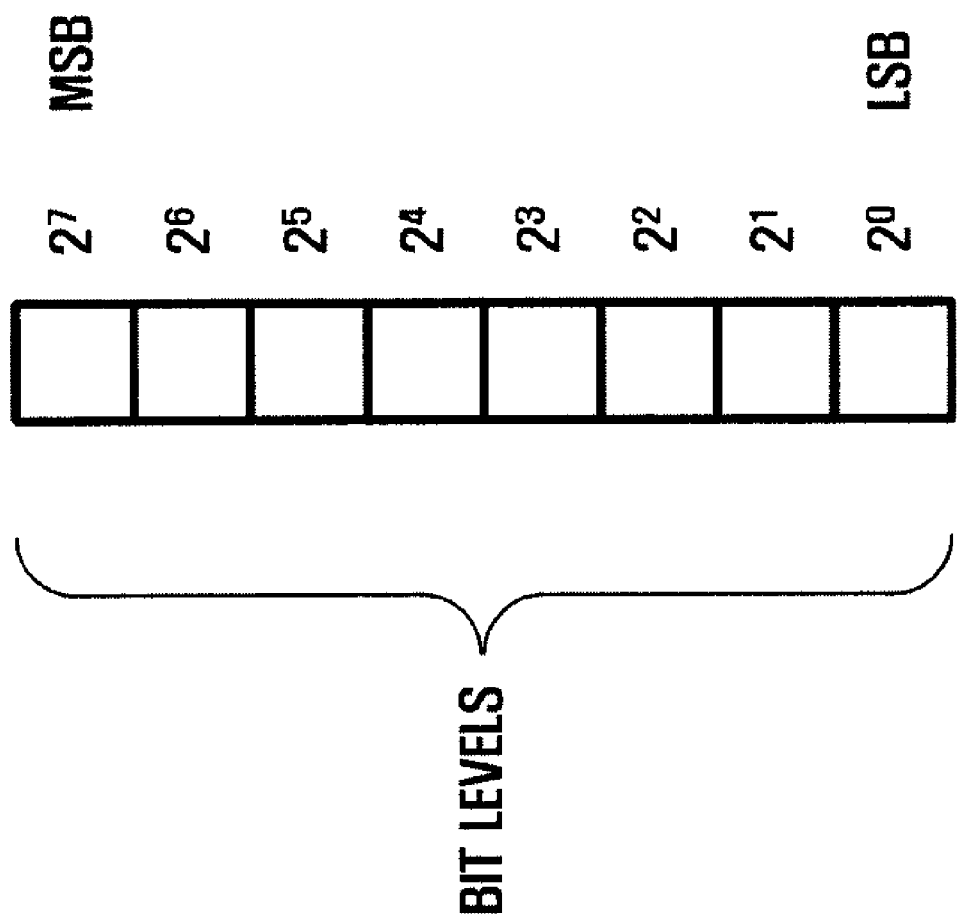
FIG. 2 is a view explaining one pixel component indicated by a plurality of bit levels.

FIG. 2 is a view explaining one pixel component indicated by a plurality of bit levels.

Referring to FIG. 2, in the case of an eight-bit image, one pixel component is composed of eight bit levels. As discussed above, the bit representing the highest degree is called an MSB, and the bit representing the lowest degree is called an LSB. That is, respective bits of one byte (i.e., eight bits) have different significance levels in restoring an image signal or an audio signal. Here, the most significant field may include two upper bits or four upper bits among eight bits, and the least significant field may include two lower bits or four lower bits among the eight bits. However, the number of bits included in the most significant filed or the least significant field is not limited thereto, but may be extended or changed by those having ordinary skill in the technical field to which the present invention pertains.

Figure 3:
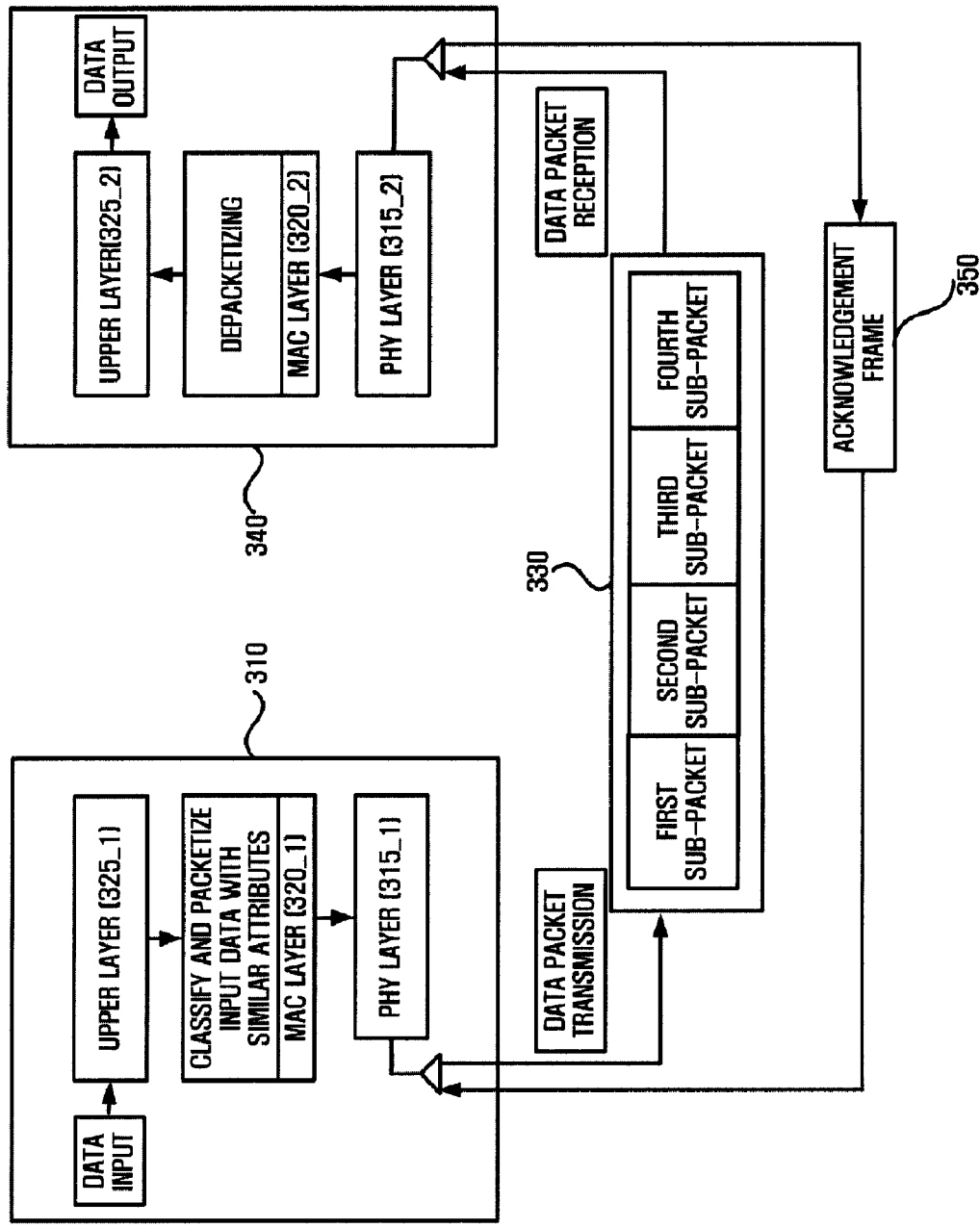
FIG. 3 is a view illustrating the construction of a data-error-searching system including data transmitting and receiving apparatuses according to an exemplary embodiment of the present invention.

FIG. 3 is a view illustrating the construction of a data-error-searching system including data transmitting and receiving apparatuses according to an exemplary embodiment of the present invention.

Referring to FIG. 3, a data-error-searching system includes a transmitting apparatus 310 and a receiving apparatus 340, and data packets are transmitted or received between the transmitting apparatus and the receiving apparatus.

Communication layers may include physical (PHY) layer 315_1 of the transmitting apparatus 310 and PHY layer 315_2 of the receiving apparatus 340, each of which is composed of a channel layer that is the lowest physical medium of a specified frequency band through which a wireless signal is propagated, a radio frequency (RF) layer, and a baseband layer, media access control (MAC) layer 320_1 of the transmitting apparatus 310 and MAC layer 320_2 of the receiving apparatus 340, and upper layer 325_1 of the transmitting apparatus 310 and upper layer 325_2 of the receiving apparatus 340. Here, the upper layer 325_1 and 325_2 are layers above the MAC layers 315_1 and 315_2, respectively, and may include a logical link control (LLC) layer, a network layer, a transmission layer, an application layer, and so forth.

In many wireless communication systems, a frame structure is used to transmit data between the transmitting apparatus 310 and the receiving apparatus. For example, the IEEE 802.11 standard uses frame sets in the MAC layers and PHY layers. If data is input to the upper layers 325_1 and 325_2 in a general transmitting apparatus 310, the upper layers 325_1 and 325_2 transfer the input data to the MAC layers 320_1 and 320_2, and the MAC layers 320_1 and 320_2 separate the input data into MAC Service Data Units (MSDUs). Then, the MAC layers construct MAC Protocol Data Units (MPDUs) by adding MAC headers to the MSDUs. The MAC header includes information such as a source address, a destination address, and so forth.

A process in which the transmitting apparatus 310 generates packets by separating the input data into MSDUs is called a packetization process, while a process in which the receiving apparatus 340 generates output data by processing the received packets is called a depacketization process.

In an exemplary embodiment of the present invention, the packetization process allocates data having similar attributes (i.e., properties) among the input data to different sub-packets, e.g., a first sub-packet and a second sub-packet. Accordingly, the first sub-packet and the second sub-packet have similar properties. Even though the transmitting apparatus 310 has transmitted the first sub-packet and the second sub-packet to the receiving apparatus 340, the receiving apparatus 340 may receive the first sub-packet, but may not receive the second sub-packet, or an error may occur in the second sub-packet received. In this case, the receiving apparatus 340 may compensate for the second sub-packet using the first sub-packet received. Such a compensation method will be described later with reference to FIG. 5.

If MPDUs are transferred to the physical layers 315_1 and 315_2, the physical layers 315_1 and 315_2 generate PHY Protocol Data Units (PPDUs) by adding PHY headers (e.g., PHY preambles) to the MPDUs as parts of PHY Service Data Units (PSDUs), and transmit the generated PPDUs to the receiving apparatus 340. The PHY header may include variables for determining transmission schema that includes coding/modulation schema.

The receiving apparatus 340 generates output data from the packet 330 received through a process opposite to the above-described process.

Particularly, if the data is video data, pixels of image frames may be divided into a plurality of scan lines. Each scan line includes a plurality of pixels indicated by the number of pixel components. The quantization of one pixel depth or the number of bits per pixel component may correspond to any one of 8-bit, 10-bit, 12-bit, and 16-bit values. The pixel component includes color and luminance components of an image. In the case of the 8-bit quantization and 60 frames per second, segments of an uncompressed image (1080 p) may be represented by $60 \times 3 \times 8 \times 1920 \times 1080 = 2.98$ Gb. Accordingly, it is impossible for the transmitting apparatus 310 to retransmit the whole streams to the currently synced receiving apparatus 340, such as a TV display, within a predetermined time.

According to exemplary embodiments of the present invention, it is permitted to selectively retransmit video data in accordance with the perceptive significance of the video data. If frames of image pixels including a plurality of components (e.g., R, G, and B color components) are given, different bits of the respective pixel components do not exert the same influence upon the quality of the image. For example, the MSB has a greater effect on the image quality than the LSB. Accordingly, in the case of retransmission, the highest retransmission priority is given to the MSB to protect the bandwidth and to reduce a retransmission delay.

Generally, the most reliable coding/modulation schema is applied to a PHY signal field in the PHY header, and a special cyclic redundancy check (CRC) is additionally performed to secure that this information has been successfully received in the receiving apparatus 340. Payload data in the MAC header and MSDU are equally managed, and are transmitted using the same coding/modulation schema that is less stronger than the coding/modulation schema for the PHY signal field of the PHY header. In addition, a preamble is added to the PPDU before the transmitting apparatus 310 transmits the packet to the receiving apparatus 340, and this preamble may include a channel-estimation value and synchronization information.

If the packet 330 is transferred to the receiving apparatus 340, the receiving apparatus 340 searches for an error in the received packet. If an error exists, the receiving apparatus 340 may transmit an acknowledgement frame 350 for requesting the retransmission of the packet 340 in which the error has occurred.

Details of the transmitting apparatus 310, the receiving apparatus 340, the data packet 330, and the acknowledgement frame 350 will be described later.

Figure 4:
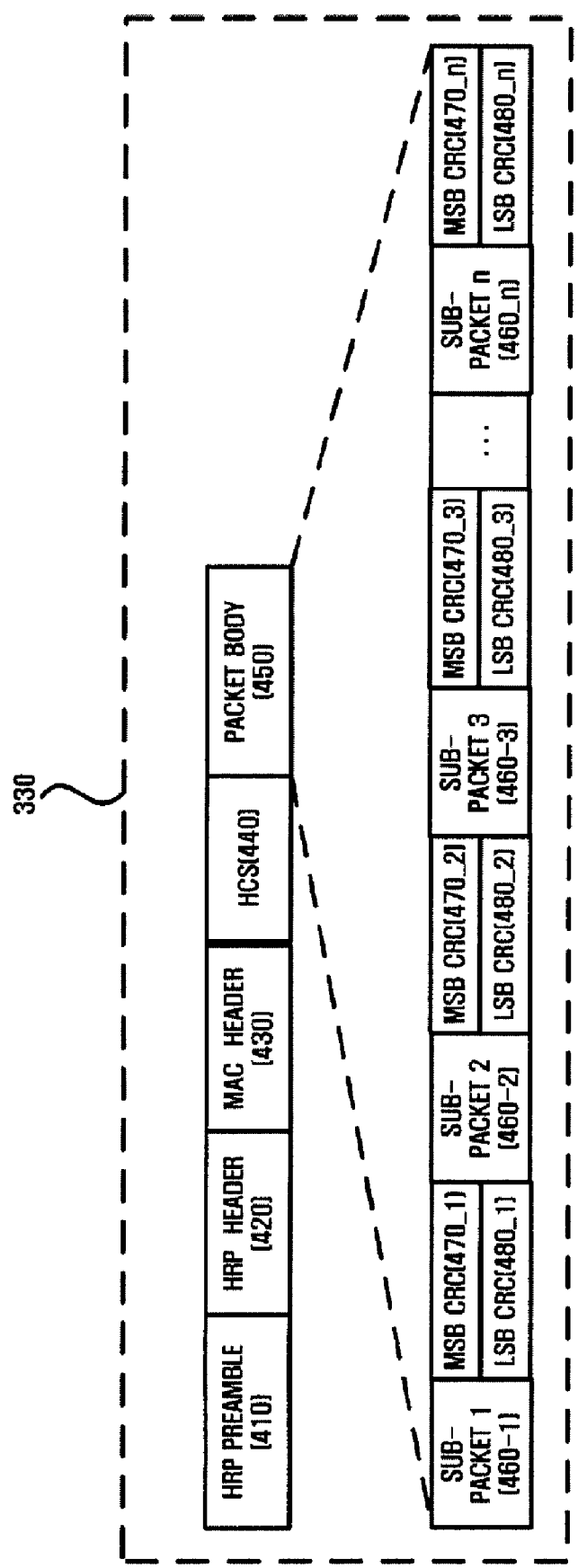
FIG. 4 is a view illustrating the structure of data transmitted or received between the data-transmitting apparatus and the data-receiving apparatus in the data-error-searching system of FIG. 3.

FIG. 4 is a view illustrating the structure of HRP packet transmitted or received between the data-transmitting apparatus and the data-receiving apparatus in the data-error-searching system of FIG. 3.

Referring to FIG. 4, an HRP protocol data unit (HRPPDU) packet 330 (hereinafter referred to as "HRP packet") includes an HRP preamble 410, an HRP header 420, an MAC header 430, a header check sum (HCS) field 440, and a packet body 450. The HRP packet 330 may further include a beam tracking field used to perform a beam tracking work (not illustrated in the drawing).

The HRP preamble 410 is used for the receiving apparatus 340 having received the HRP packet 330 to perform an auto gain control, phase estimation, channel estimation, and so forth.

The packet body 450 may include one or more sub-packets 460_1 to 460_n. The sub-packets 460_1 to 460_n may be constructed with the same size or with different sizes. It is preferable that the number of sub-packets that constitute the packet body 450 is 7. However, the present invention is not limited to the number of sub-packets included in the packet body 450.

The transmitting apparatus 310 may divide the data to be transmitted into pieces having a predetermined size, and the divided pieces of data may be included in the sub-packets. For example, as illustrated in FIG. 4, the transmitting apparatus 310 may divide the video data into several data pieces, and generate a plurality of sub-packets that include the data pieces. If the size of the data to be transmitted is equal to or smaller than the predetermined size of the sub-packet, the data may be included in a sub-packet without division.

In addition to the video data, audio data, AV control data, and other additional data (e.g., caption data) may also be constructed in the sub-packet. Here, the AV control data is data required to normally transmit and process the AV data between a source device and a sink device, and may be a message for requesting a connection or release of the AV stream connection, a playback control message of the AV data, information on a device (device name, and device type), and so forth.

The MAC header 430 may include an address of the transmitting apparatus 310 that transmits the HRP packet 330, an address of the receiving apparatus 340 that receives the HRP packet 330, and so forth.

The HCS field 440 may include HCS information of the HRP header 420 and the MAC header 430.

The HRP header 420 may include information required for the receiving apparatus 340 to physically process the HRP packet 330. Specifically, as illustrated in FIG. 3, the HRP header 420 includes a PHY control field and one or more sub-packet headers.

In contrast, the respective sub-packet header may include information on the sub-packets 460_1 to 460_n included in the packet body 450. The number of sub-packet headers included in the HRP header 420 may be equal to or different from the number of sub-packets included in the packet body 450. In this case, the sub-packet headers and the sub-packets may correspond to one another in the order of their arrangement. For example, the first sub-packet header may include information on the first sub-packet 460_1, and the second sub-packet header may include information on the second sub-packet 460_2. In the same manner, the n-th sub-packet header may include information on the n-th sub-packet 460_n.

The packet body 450 in the HRP packet 330 may include a CRC field for checking errors of the sub-packets 460_1 to 460_n. The CRC field includes CRC values of the data in the packet body. Here, the data may include video data, audio data, uncompressed data, and so forth.

In an exemplary embodiment of the present invention, the CRC field may be divided into MSB CRC fields 470_1 to 470_n for checking errors of the MSB data and LSB CRC fields 480_1 to 480_n for checking for errors in the LSB data, and at least one of the MSB CRC fields 470_1 to 470_n and the LSB CRC fields 480_1 to 480_n may be included in the packet body 450. The MSB CRC fields 470_1 to 470_n include CRC values of the MSB data, and the LSB CRC fields 480_1 to 480_n include CRC values of the LSB data. Also, the HRP header 420 or the MAC header 430 may include a CRC control field for making the receiving apparatus 340 that has received the packet recognize the CRC field check for errors in the received packet.

Accordingly, if the HRP packet 330 is received, the receiving apparatus can detect the error of the received HRP packet 330 by calculating the CRC values of the MSB CRC fields 470_1 to 470_n and the LSB CRC fields 480_1 to 480_n as described above.

The sub-packet header (not illustrated) may include a length field, an HRP mode index field, a sub-packet number field, and a CRC control field. The length field indicates the length of a corresponding sub-packet, and the HRP mode index field indicates an HRP mode index of an HRP mode applied to the corresponding sub-packet. Also, the sub-packet number field indicates the number of the corresponding sub-packet, and the CRC control field indicates the CRC value corresponding to the sub-packet. The receiving apparatus 340 can confirm the sub-packet numbers of the respective sub-packets included in the HRP packet using the sub-packet number field. Accordingly, if there is any sub-packet to be retransmitted due to an error occurrence, the receiving apparatus 340 transmits the sub-packet number of the corresponding sub-packet to the transmitting apparatus 310. In this case, the transmitting apparatus 310 retransmits the sub-packet corresponding to the sub-packet number transmitted from the receiving apparatus 360.

Although not separately illustrated in the drawing, a PHY control field 360 may include a beam tracking bit, an UEP mapping bit, a scrambler initialization seed bit, and so forth. The beam tracking bit indicates whether the HRP packet 330 includes a beam tracking field. For example, if the HRP packet 330 includes the beam tracking field, the beam tracking bit is set to "1", while otherwise, it is set to "0". The UEP mapping bit includes information for identifying whether the UEP mode applied to the sub-packet is a UEP mapping mode or a UEP coding mode. For example, if the UEP mapping mode is applied, the UEP mapping bit is set to "1", while if the UEP coding mode is applied, the UEP mapping bit is set to "0". The scrambler initialization seed bit indicates an initialization seed used when the data to be transmitted is scrambled.

Figure 5:
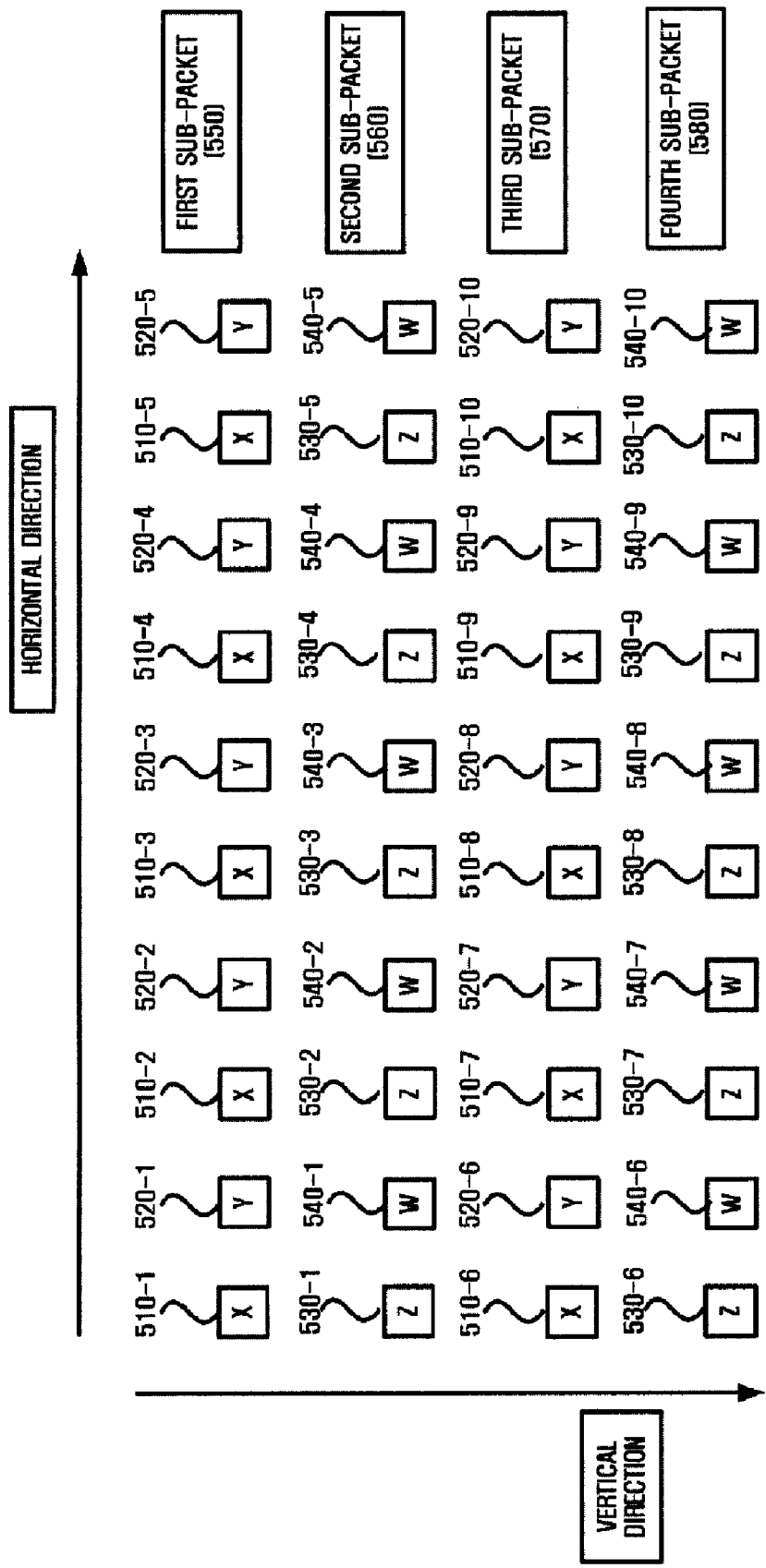
FIG. 5 is a view explaining production of sub-packets through input data classification performed by the transmitting apparatus 310 of FIG. 3.

FIG. 5 is a view explaining production of sub-packets through input data classification performed by the transmitting apparatus 310 of FIG. 3.

Referring to FIG. 5, when input data that includes pixel components is displayed, adjacent pixel components generally have similar attributes. Here, the attribute includes features of pixels such as color, luminance, and so forth. In the following description of the present invention, pixel components may include pixels.

Classified pixel components having the similar attributes are allocated, for example, to the first sub-packet and the second sub-packet. Then, the transmitting apparatus 310 transmits classified sub-packets having similar attributes to the receiving apparatus 340. If the receiving apparatus 340 has received the first sub-packet, but an error occurs during the transmission of the second sub-packet, the receiving apparatus 340 can compensate for the second sub-packet with the first sub-packet having the similar attribute, and since the attributes of the first sub-packet and the second sub-packet are similar to each other, the receiving apparatus can provide a video image similar to the original video data. The application of the present invention is not limited to the first and second sub-packets, but may be applied to a packet unit that includes many sub-packets.

In an exemplary embodiment of the present invention, position information of the pixel components among the above-described attributes may be used. According to experiential rules, in the case of the video data, the adjacent pixel components have similar attributes. Accordingly, the attributes and position information of the pixel components may be extracted from the input data, the adjacent pixel components may be classified using the extracted position information, and then the classified pixel components may be allocated to separate sub-pixels.

In an exemplary embodiment of the present invention, if it is assumed that one picture displayed on a display screen is classified into four sub-packets, as illustrated in FIG. 5, pixel units 510_1 to 510_10 belonging to a first type indicated by "X" may be allocated to a first sub-packet 550, and pixel units 520_1 to 520_10 belonging to a second type indicated by "Y" may be allocated to a second sub-packet 560. The first type pixel units and the second type pixel units may be successively allocated to the first sub-packet and the second sub-packet. Also, the first type pixel units and the second type pixel units may be repeatedly allocated to the first sub-packet and the second sub-packet. In an exemplary embodiment of the present invention, the first type pixel unit and the second type pixel unit may be adjacent to each other.

In an exemplary embodiment of the present invention, pixel units 530_1 to 530_10 belonging to a third type indicated by "Z" may be allocated to a third sub-packet 570, and the third type pixel units and the third sub-packet to which the third type pixel units are allocated may be further included. Also, as described above, the third type pixel unit may be adjacent to at least one of the first type pixel unit and the second type pixel unit. The first, second and third type pixel units may be successively allocated to the first, second and third sub-packets, and through a repetition of the above-described process, the first, second and third type pixel units may be repeatedly allocated to the first, second, and third sub-packets.

In an exemplary embodiment of the present invention, pixel units 540_1 to 540_10 belonging to a fourth type indicated by "W" may be allocated to a fourth sub-packet 580, and the fourth type pixel units and the fourth sub-packet to which the fourth type pixel units are allocated may be further included. Also, as described above, the fourth type pixel unit may be adjacent to at least one of the first type pixel unit, the second type pixel unit, and the third type pixel unit. The first, second, third and fourth type pixel units may be successively allocated to the first, second, third and fourth sub-packets, and through a repetition of the above-described process, the first, second, third and fourth type pixel units may be repeatedly allocated to the first, second, third and fourth sub-packets. As illustrated in FIG. 5, the adjacent pixel components may be repeatedly allocated to the respective sub-packets. In addition, the first, second, third and fourth type pixel units may include at least one pixel, and in an exemplary embodiment of the present invention, the first type pixel unit, the second type pixel unit, the third type pixel unit, and the fourth type pixel unit may be adjacent to one another.

In addition to the pixel components having similar positions, pixel components having similar attributes can be allocated to other sub-packets according to a user's setting. The input data is not limited to video data, but may include audio data and so on. Also, it is not required for the pixel components having similar positions to be adjacent to one another, and they may be arranged at predetermined intervals. The predetermined intervals may be changed according to a user's definition.

As described above, the transmitting apparatus 310 classifies the input data into a plurality of sub-packets, generates a packet by gathering the classified sub-packets, and then transmits the generated packet to the receiving apparatus 340. The receiving apparatus 340 depacketizes the received packets, and compensates for erroneous data by replacing the sub-packet in which an error has occurred by a similar packet.

Figure 6:
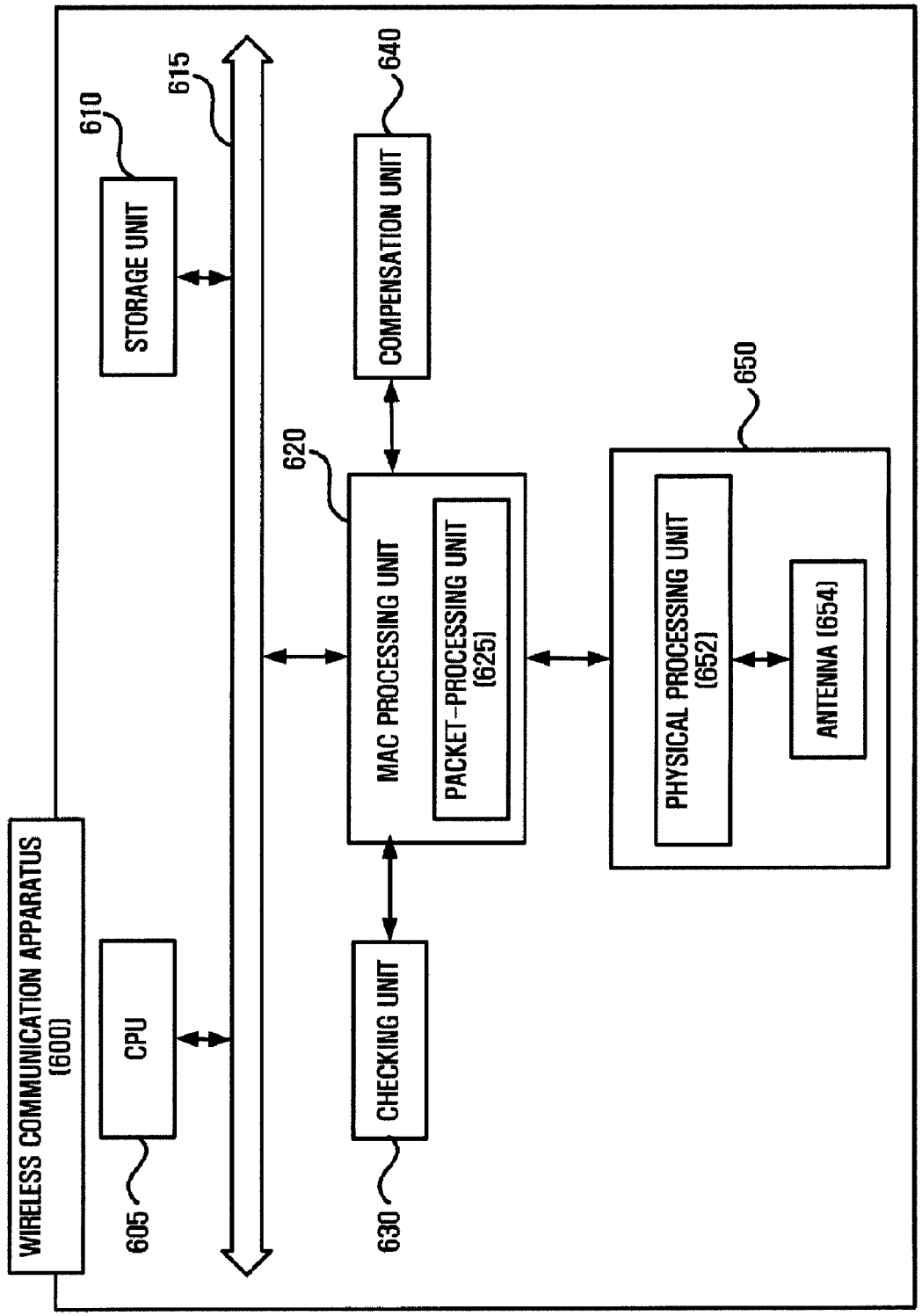
FIG. 6 is a view illustrating the construction of a wireless communication apparatus 600 in the data-error-searching system of FIG. 3.

FIG. 6 is a view illustrating the construction of a wireless communication apparatus 600 in the data-error-searching system of FIG. 3.

Referring to FIG. 6, a wireless communication apparatus 600 may be the above-described transmitting apparatus 310, the receiving apparatus 340, or the error searching apparatus according to the present invention. The wireless communication apparatus 600 may include a central processing unit (CPU) (605, a storage unit 610, an MAC processing unit 620, a checking unit 630, a compensation unit 640, and a transmitting/receiving unit 650. The MAC processing unit 620 may include a packet-processing unit 625, and the transmitting/receiving unit 650 may include a physical processing unit 652 and an antenna 654.

The CPU 605 controls other constituent elements connected to a bus 615, and takes charge of a data process on an upper layers of an MAC layer among general communication layers, such as an LLC layer, a network layer, a transmission layer, an application layer, and so forth). Accordingly, the CPU 605 processes the received data that is provided from the MAC processing unit 620, or generates and provides transmitted data to the MAC processing unit 620. For example, data generated or processed by the CPU 605 may be uncompressed AV data.

The storage unit 620 stores the received data that is processed by the CPU 605 or stores the transmitted data generated by the CPU 605. The storage unit 610 may be implemented by a nonvolatile memory such as a ROM, a PROM, an EPROM, an EEPROM, and a flash memory, a volatile memory such as a RAM, a storage medium such as an optical disk, or other memories known in the corresponding field.

The checking unit 630, as described above, serves to check an error of the received data that is transferred from the MAC processing unit 620. A CRC control field confirms CRC values of a CRC field in the received data, and transfers the confirmed CRC values to the checking unit 630. The checking unit 630 checks the error of the received data by operating the CRC values of the CRC field.

In an exemplary embodiment of the present invention, the CRC field may include at least one of an MSB CRC field and an LSB CRC field. The checking unit 630 checks an error of MSB data using the MSB CRC field, and checks an error of LSB data using the LSB CRC field. If an error occurs in the received data, the checking unit 630 generates and provides a signal for reporting the error occurrence to the compensation unit 640.

If the error generation signal is transferred from the checking unit 630, the compensation unit 640 serves to compensate for the error of the data in the above-described manner.

In an exemplary embodiment of the present invention, if the error occurs, the receiving apparatus generates and transfers an acknowledgement (ACK) frame to the transmitting apparatus 310. The ACK frame includes information on the error occurrence data, and the transmitting apparatus 310 that has received the ACK frame retransmits data corresponding to the error occurrence data or data having a similar attribute to the error occurrence data to the receiving apparatus 340. Accordingly, the receiving apparatus 340 can receive the data corresponding to the error occurrence data or the data having the similar attribute to the error occurrence data. The above-described data may include data transmission units (i.e., sub-packets). Also, the received data (i.e., the second received data) may include an erroneous data confirmation field that can confirm that the received data has been received.

In an exemplary embodiment of the present invention, if an error occurs, as described above, the sub-packets of the received data (i.e., the first received data) have a plurality of sub-packets having similar attributes, and the compensation unit compensates for the sub-packet in which the error has occurred through the replacement of the sub-packet by a sub-packet having the most similar attribute.

The MAC processing unit 620 generates sub-packets using data provided from the CPU 605, and transfers the generated sub-packets to the transmitting/receiving unit 650. It is also possible that the MAC processing unit 620 transfers the sub-packets provided from the CPU 605 to the transmitting/receiving unit 650. The MAC processing unit 620 determines the order of arrangement of the sub-packets so that the sub-packets having similar kinds of data are adjacent to one another in the packet body.

In addition, the MAC processing unit 620 transfers data included in the sub-packets provided from the transmitting/receiving unit 650 to the CPU 605. If a plurality of sub-packets is provided, the MAC processing unit 620 may combine the data included in the respective sub-packets to provide combined data.

The packet-processing unit 625 generates a packet that includes the sub-packets provided from the MAC processing unit 620. The packet generated by the packet-processing unit 625 may be, for example, an HRP packet as described above with reference to FIG. 4. That is, the packet-processing unit 625 may determine a transmission mode to be applied to the sub-packets according to the type of data included in the sub-packets, and set an identifier of the determined transmission mode in the packet header. Also, the packet-processing unit 625 may report the transmission mode to be applied to the respective sub-packets to the physical processing unit 652.

In contrast, the packet-processing unit 625 confirms the transmission mode applied to the sub-packets included in the packet by analyzing the header of the packet transmitted from another wireless communication apparatus. Through this, the packer processing unit 625 informs the physical processing unit 652 what signal processing mode should be applied to the respective sub packets. Also, the packet-processing unit 625 extracts the sub-packets from the received packet.

The transmitting/receiving unit 650 transmits the packet including the sub-packets provided from the MAC processing unit 620 to another wireless communication apparatus. Also, the transmitting/receiving unit 650 receives the packet transmitted from another wireless communication apparatus, and transfers the sub-packets included in the received packet to the MAC processing unit 620.

Specifically, the transmitting/receiving unit 650 may include the physical processing unit 652 and the antenna 654.

The physical processing unit 652 performs a signal process for transmitting the packet transferred from the packet-processing unit 625, and wirelessly outputs the processed packet through the antenna 654. Here, the signal process may be performed for each packet header and sub-packet. The signal process may include coding and modulation works. The physical processing unit 652 processes the header and the sub-packets of the packet with a proper coding mode and a modulation method under the control of the packet-processing unit 625. Even without the control of the packet-processing unit 625, the physical processing unit 652 can perform the signal process of the header of the packet using a coding mode and a modulation method set by default.

In contrast, the physical processing unit 652 receives the packet transmitted from another wireless communication apparatus through the antenna 654 and performs a signal process of the received packet. Here, the signal process may include demodulation and decoding works. The type of demodulation method and the type of decoding mode to be used may controlled by the packet-processing unit 625. Even without the control of the packet-processing unit 625, the physical processing unit 652 can perform the signal process of the header of the packet using a demodulation method and a decoding mode set by default. The physical processing unit 652 may be implemented by HRP. Although not illustrated in the drawing, the wireless communication apparatus 600 may include another physical processing unit implemented by LRP.

The constituent elements of the wireless communication apparatus 600 as described above with reference to FIG. 6 may be implemented by modules. The term "module" includes, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

FIG. 7 is a view illustrating a method of searching for erroneous data according to an exemplary embodiment of the present invention.

Referring to FIG. 7, data is received from the transmitting apparatus 310 (S710). The received data has a packet structure as described above, and a packet may include an HRP preamble 410, an HRP header 420, an MAC header 430, an HCS field 440, and a packet body 450. The packet body may include a plurality of sub-packets 460-1 to 460_4, and one or more MSB CRC fields 470_1 to 470_4 and LSB CRC fields 480_1 to 480_4.

If data is received, it is checked whether the received data is uncompressed data (S720). The received data may include a compression identification bit for confirming that the data is compressed, and at least one of an MAC header and an HRP header. For example, if the data is compressed data, "0" is set, while if the data is uncompressed data, "1" is set. Operation S720 may be selectively applied, or may not be applied according to a user's setting.

If the data is not uncompressed data, the error checking is terminated.

In the case of the uncompressed data, it is checked whether an error occurs in the received data (S730). Here, the error may include a loss or an error of a part of data. The error of the received data can be checked using the CRC field included in the received data. Here, the CRC field may be included in the packet body 450 and so on so as to check the error of the sub-packets 460_1 to 460_2 included in the packet body 450.

In an exemplary embodiment of the present invention, it may be preferable that the CRC field for checking the error is provided for each sub-packet, and it also may be preferable that an MSB CRC field and an LSB CRC field for checking errors of MSB data and LSB data stored in a sub-packet are separately provided. However, the present invention is not limited thereto, and a CRC field for checking all or a part of the sub-packets in the packet body may be provided.

If no error exists, the error checking of the received data is terminated.

If an error exists, retransmission of normal data that corresponds to the erroneous data is requested (S740). If an error occurs in the received data, the receiving apparatus 340 requests the retransmission of the data in which the error has occurred to the transmitting apparatus 310. Here, retransmission of all the data may be requested. The transmitting apparatus 310, which has received the request, retransmits the requested data. Operation S740 may be selectively applied or may not be applied according to a user's setting.

However, if an error occurs in the LSB data of the received data, the retransmission of normal data that corresponds to the erroneous data may not be requested, but the erroneous data may be compensated for through a compensation process S770.

If the requested data has been retransmitted, the receiving apparatus 340 confirms that the normal data has been retransmitted (S750). As described above, it is checked whether an error has occurred in the retransmitted data through the error checking process. Operation S750 may be selectively applied, or may not be applied according to a user's setting.

In the case of no error occurrence, the erroneous data is replaced by the retransmitted normal data, and the error compensation process is terminated (S760). Operation S760 may be selectively applied or may not be applied according to a user's setting.

In an exemplary embodiment of the present invention, if an error occurs in the retransmitted data, a request for retransmission of the erroneous data is transferred to the transmitting apparatus 310, and the erroneous data is compensated for by repeating the process until normal data is received.

If an error has occurred in the retransmitted data, the erroneous data is compensated for using the previously received data (S770).

As described above, the erroneous data is compensated for using the data having the most similar attribute to the erroneous data, and then the error compensation process is terminated. However, the present invention is not limited thereto, and operations S720, S750, and/or S760 may be omitted according to exemplary embodiments of the present invention.

As described above, the apparatus and method of searching for erroneous data according to the exemplary embodiments of the present invention have the advantages that even if an error occurs in the received data, the error of the most significant field of the received data is preferentially searched, and if an error occurs in the most significant field, the most significant field is preferentially received, so that wireless communication channels can be efficiently used.

The apparatus and method for searching erroneous data according to the exemplary embodiments of the present invention also have the advantages that if an error occurs in the received data, the erroneous data can be compensated for even without the retransmission of the erroneous data.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method of searching for erroneous data, the method comprising:
    checking, by a receiving apparatus, received data using an error-checking field included in the received data only when the received data is uncompressed data; and
    compensating, by the receiving apparatus, for erroneous data of the received uncompressed data based on a result of the checking.

2. The method of claim 1, further comprising checking whether the received data is compressed data using a compression identification field included in the received data before the checking the received data, and terminating if the received data is not uncompressed data;
    wherein the compression identification field indicates whether the received data is the compressed data or uncompressed data.

3. The method of claim 1, wherein the received data includes a data transmission unit including at least one of a most significant field and a least significant field; and
    wherein the error-checking field includes at least one of a most significant error-checking field for detecting an error of the most significant field and a least significant error-checking field for detecting an error of the least significant field.

4. The method of claim 3, wherein the received data includes at least one of video data and audio data.

5. The method of claim 3, wherein the checking comprises checking the data transmission unit using at least one of the most significant error-checking field and the least significant error-checking field.

6. The method of claim 4, wherein the video data includes a positional relationship among pixel components and information on the pixel components including at least one of colors of the pixel components and luminance of the pixel components.

7. The method of claim 6, wherein the data transmission unit includes another data transmission unit for extracting information on the pixel components from the video data and storing pixel components having an attribute similar to the extracted information on the pixel components.

8. The method of claim 7, wherein if the attribute of the pixel components is the positional relationship, the data transmission unit includes a first data transmission unit for storing a pixel unit belonging to a first type and a second data transmission unit for storing a pixel unit belonging to a second type that is adjacent to the pixel unit belonging to the first type, using the information on the pixel components that indicates the pixel relationship included in the video data; and
wherein remaining pixel components are successively classified into the first and second types, and are stored in the first data transmission unit and the second data transmission unit in pixel units.

9. The method of claim 8, wherein the data transmission unit further includes a third data transmission unit for storing a pixel unit belonging to a third type; and
wherein the pixel unit belonging to the third type is adjacent to at least one of the pixel unit belonging to the first type and the pixel unit belonging to the second type; and the remaining pixel components are successively classified into the first, second and third types, and are stored in the first data transmission unit, the second data transmission unit, and the third data transmission unit in pixel units.

10. The method of claim 8, wherein the data transmission unit further includes a fourth data transmission unit for storing a pixel unit belonging to a fourth type; and
wherein the pixel unit belonging to the fourth type is adjacent to at least one of the pixel unit belonging to the first type, the pixel unit belonging to the second type, and the pixel unit belonging to the third type; and the remaining pixel components are successively classified into the first, second, third and fourth types and stored in the first data transmission unit, the second data transmission unit, the third data transmission unit, and the fourth data transmission unit in the unit of a pixel.

11. The method of claim 8, wherein the pixel unit includes at least one pixel component.

12. The method of claim 7, further comprising if an error occurs in the data transmission unit, requesting retransmission of a data transmission unit that corresponds to the data transmission unit in which the error has occurred using an acknowledgement frame.

13. The method of claim 12, further comprising receiving at least one of the corresponding data transmission unit and a data transmission unit having an attribute similar to the data transmission unit in which the error has occurred after the requesting;
wherein the corresponding data transmission unit and the data transmission unit having the similar attribute include an erroneous data confirmation field for confirming that the data has been received.

14. The method of claim 8, wherein the compensating comprises replacing the first data transmission unit with the second data transmission unit if an error occurs in the most significant error-checking field of the first data transmission unit.

15. The method of claim 8, wherein the compensating comprises replacing the first data transmission unit with the second data transmission unit if an error occurs in the least significant error-checking field of the first data transmission unit.

16. An apparatus for searching for erroneous data, the apparatus comprising:
a checking unit which checks received data using an error-checking field of the received data only when the received data is uncompressed data; and
a compensation unit which compensates for erroneous data of the received uncompressed data based on a result of checking by the checking unit,
wherein at least one of the checking unit and the compensation unit is implemented by a hardware processor.

17. The apparatus of claim 16, wherein the received data includes a compression identification field indicating whether the received data is compressed data or uncompressed data.

18. The apparatus of claim 16, wherein the received data includes:
a data transmission unit including at least one of a most significant field and a least significant field; and
an error-checking field including at least one of a most significant error-checking field for detecting an error of the most significant field and a least significant error-checking field for detecting an error of the least significant field.

19. The apparatus of claim 18, wherein the data includes at least one of video data and audio data.

20. The apparatus of claim 18, wherein the checking unit checks the data transmission unit using at least one of the most significant error-checking field and the least significant error-checking field.

21. The apparatus of claim 18, wherein if an error occurs in the data transmission unit, the checking unit requests retransmission of the data transmission unit in which the error occurs using an acknowledgement frame.

22. The apparatus of claim 19, wherein the video data includes a positional relationship among pixel components and information on the pixel components indicating colors of the pixel components and luminance of the pixel components.

23. The apparatus of claim 22, wherein the data transmission unit includes another data transmission unit for extracting information on the pixel components from the video data and storing pixel components having an attribute similar to the extracted information on the pixel components.

24. The apparatus of claim 23, wherein if the attribute of the pixel components is the positional relationship, the data transmission unit includes a first data transmission unit for storing a first pixel including pixel units and a second data transmission unit for storing a second pixel including the pixel units adjacent to the first pixel, using the information on the pixel components that indicates the pixel relationship included in the video data; and
wherein remaining pixel components are successively stored in the first data transmission unit and the second data transmission unit in the unit of a pixel.

25. The apparatus of claim 24, wherein the pixel unit includes at least one pixel component.

26. The apparatus of claim 23, wherein the compensation unit replaces the first data transmission unit with the second data transmission unit if an error occurs in the most significant error-checking field of the first data transmission unit.

27. The apparatus of claim 23, wherein the compensation unit replaces the first data transmission unit with the second data transmission unit if an error occurs in the least significant error-checking field of the first data transmission unit.

\* \* \* \* \*